(12) United States Patent
Shu et al.

(10) Patent No.: US 12,035,698 B2
(45) Date of Patent: Jul. 16, 2024

(54) INTEGRATED RICE-CRAYFISH-ORIENTAL RIVER PRAWN PLANTING-BREEDING METHOD

(71) Applicant: Zhejiang University, Hangzhou (CN)

(72) Inventors: Miaoan Shu, Hangzhou (CN); Weiren Dong, Hangzhou (CN); Xiaoling Guo, Hangzhou (CN); Yanmei Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 86 days.

(21) Appl. No.: 17/841,846

(22) Filed: Jun. 16, 2022

(65) Prior Publication Data

US 2023/0098323 A1    Mar. 30, 2023

(51) Int. Cl.
*A01K 61/59* (2017.01)
*A01G 22/22* (2018.01)

(52) U.S. Cl.
CPC .............. *A01K 61/59* (2017.01); *A01G 22/22* (2018.02)

(58) Field of Classification Search
USPC ....... 47/58.1 R, DIG. 10; 119/206, 200, 204, 119/207, 174
See application file for complete search history.

(56) References Cited

FOREIGN PATENT DOCUMENTS

| CN | 106069908 | * | 11/2016 | ............. Y02A 40/81 |
|---|---|---|---|---|
| CN | 107371929 | * | 11/2017 | ............. A01K 61/59 |
| CN | 107517902 | * | 12/2017 | ............. Y02A 40/81 |
| CN | 108605874 | * | 10/2018 | |
| CN | 109392632 | * | 3/2019 | ............. A01K 61/59 |
| CN | 110476852 | * | 11/2019 | ............. Y02A 40/81 |
| CN | 110612933 | * | 12/2019 | ............. A01K 61/59 |
| CN | 110870445 | * | 3/2020 | ............. A01K 61/59 |
| CN | 111903577 | * | 11/2020 | ............. A23K 20/24 |
| CN | 112243912 | * | 1/2021 | ............. A01G 61/59 |
| CN | 112690236 | * | 4/2021 | ............. Y02A 40/81 |
| CN | 112715440 | * | 4/2021 | ............. A23K 10/30 |
| CN | 112772321 | * | 5/2021 | ............. Y02A 40/81 |
| CN | 113099989 | * | 7/2021 | |

\* cited by examiner

*Primary Examiner* — Andrea M Valenti
(74) *Attorney, Agent, or Firm* — McClure, Qualey & Rodack, LLP

(57) ABSTRACT

The present disclosure provides an integrated rice-crayfish-oriental river prawn planting-breeding method. The method includes the following steps: stocking crayfish postlarvae in a paddy field as an integrated rice-crayfish-oriental river prawn farming area from February to March, catching and marketing the crayfish from May to June; planting in mid-June, sun-drying rice seedlings in the field in late June, cleaning and disinfecting a ring ditch surrounding the paddy field, and transplanting some aquatic plants; stocking oriental river prawn postlarvae in early July; harvesting ripe rice in late October; and catching and marketing the oriental river prawns in November. On the premise that the rice planting area is not reduced, the present disclosure realizes the effective expansion of time and space of the paddy field and improves comprehensive benefits of rice-fish farming in the form of integrated rice-crayfish-oriental river prawn planting-breeding.

10 Claims, No Drawings

INTEGRATED RICE-CRAYFISH-ORIENTAL RIVER PRAWN PLANTING-BREEDING METHOD

CROSS REFERENCE TO RELATED APPLICATION

This patent application claims the benefit and priority of Chinese Patent Application No. 202111128261.8, entitled INTEGRATED RICE-CRAYFISH-ORIENTAL RIVER PRAWN PLANTING-BREEDING METHOD filed on Sep. 26, 2021, the disclosure of which is incorporated by reference herein in its entirety as part of the present application

TECHNICAL FIELD

The present disclosure relates to the technical field of integrated planting-breeding of aquatic and agricultural products, and in particular relates to an integrated rice-crayfish-oriental river prawn planting-breeding method.

BACKGROUND ART

The integrated rice-fish farming model embodies "dual purposes for one water, dual harvests in one field, stable grain and increased efficiency, win-win for grain and fishery, and ecological and environmental protection". This model has promoted farmers' income increase and made great contributions to ensuring food security and ecological security. The rice-fish project is booming in China's rural areas, and has now formed a modern rice-fish farming industry with nearly 20 species for breeding and a planting area of more than 34 million mu. The rice-fish farming model is also constantly developing and evolving.

At present, the rice-fish farming industry mainly includes the following modes: (1) Symbiotic farming mode: this is a mode of planting rice while breeding some high-temperature tolerant aquatic species, mainly including carp, loaches, rice field eels, river crabs, freshwater shrimps, Chinese soft-shell turtles, bullfrogs, black-spotted pond frogs, and the like. (2) Continuous cropping-based farming mode: This mode refers to a mode of breeding aquatic species, mainly including crayfish (*Procambarus clarkii*), in the paddy field in idle time of winter and spring, namely the period from the harvest of rice in every October to the beginning of rice planting in June of the next year, such as the ecological planting and breeding method for continuous cropping of rice and crayfish as set forth in Chinese Patent Application Publication No. CN111543269A. (3) Continuous cropping and symbiotic integrated farming mode: Compared with the previous two modes, this mode can breed aquatic species both during the idle period of the paddy field and the period of rice planting, making full use of the space and time of the paddy field and producing higher economic benefits. It is the future development direction of rice-fish farming agriculture. For example, Chinese Patent Application Publication No. CN102090291A proposes a composite planting and cultivating method for rice, crayfish and soft-shell turtle. The method combines the ditches with the paddy field, with young soft-shelled turtles stocked in May, and crayfish postlarvae stocked from September to October, such that an integrated farming mode of rice-soft-shell turtle symbiosis and continuous rice-crayfish cropping is realized. Chinese Patent Application Publication No. CN111480603A provides a method for ecologically breeding rice, crayfish and soft-shell turtles in a rice field. The patent utilizes a biological characteristic that Chinese soft-shell turtle likes eating crayfish to clear the remaining crayfish from the paddy field, prevents the mating and reproduction of the crayfish in the same paddy field, and selects allopatric crayfish parents again, so as to achieve the directional optimized breeding of the crayfish. The crayfish and Chinese soft-shell turtles with improved quality, together with the harvested high-quality rice, increases the output value per mu. However, in the above continuous cropping and symbiotic integrated farming mode, different bred aquatic species cannot "peacefully coexist", affecting the breeding efficiency.

Therefore, the present disclosure adopts an integrated rice (*Oryza sativa*)-crayfish (*P. clarkii*)-oriental river prawn (*Macrobrachium nipponense*) planting-breeding method, and utilizes the different requirements of water temperature for the growth of polyculture species to realize the ternary integrated planting-breeding in the same paddy field at the temporal and spatial levels, effectively improving the utilization efficiency and planting-breeding benefits of paddy fields. This mode effectively expands the time and space of planting and breeding in paddy fields, increases the comprehensive benefits of paddy field aquaculture, further improves the yield and quality of agricultural products, and realizes the common development of aquaculture and agricultural cultivation.

SUMMARY

To make up for the deficiencies of the prior art, an objective of the present disclosure is to provide an integrated rice-crayfish-oriental river prawn planting-breeding method. On the premise that the rice planting area is not reduced, the present disclosure realizes the effective expansion of time and space of the paddy field and improves comprehensive benefits of rice-fish farming in the form of integrated rice-crayfish-oriental river prawn planting-breeding.

To achieve the above objective, the present disclosure adopts the following technical solution:

(1) An integrated rice-crayfish-oriental river prawn planting-breeding method is provided, including the following steps: stocking crayfish postlarvae in a paddy field as an integrated rice-crayfish-oriental river prawn farming area from February to March, catching and marketing the crayfish from May to June.

In some embodiments, the crayfish postlarvae may be stocked at 3,000-6,000 postlarvae/mu.

In some embodiments, the paddy field may be surrounded by a ring ditch, and the ring ditch may be 2.5 m wide at the top, 1.0 m wide at the bottom, and 1.0 m deep, and may have a slope ratio of 1:1.5; an area of the ring ditch may account for no greater than 10% of that of the paddy field. The ring ditch may be used as a place for crayfish and freshwater shrimp to avoid summer heat in hot summer and as a place for shelter, shade and habitat during rice sun-drying, fertilization and spraying.

In some embodiments, anti-escape facilities may be arranged around the paddy field to prevent the crayfish and the oriental river prawn from escaping. Preferred anti-escape facilities may include iron sheets and other materials, with lower parts thereof buried in the soil for at least 20 cm, and upper parts thereof 50-60 cm above the ridge, supported and fixed with wooden stakes or bamboo poles every 1-1.5 m; alternatively, nylon or linen meshes and rigid plastic films are used to prevent escape.

(2) Planting rice from late May to mid-June, sun-drying rice seedlings in the field in late June, cleaning and disinfecting a ring ditch surrounding the paddy field, and transplanting some aquatic plants.

In some embodiments, the rice are selected from elite rice cultivars with short planting period, strong lodging resistance, strong disease resistance and good quality, for example hybrid rice such as *Oryza sativa* cv. Jiayouzhongke 3 and *Oryza sativa* cv. Chunyou T30, so as to be suitable for a rice-crayfish symbiotic mode.

In some embodiments, the rice is planted in a narrow-row manner, which is conducive to the passage of the crayfish and freshwater shrimp in the field, improves ventilation and light transmission conditions in the field, lowers the temperature and reduces the occurrence of diseases and pests. In certain embodiments, the planting density on both sides of the ring ditch may be increased to give full play to the edge advantage.

In some embodiments, the aquatic plants may include one or more of *Elodea nuttallii*, *Alternanthera philoxeroides*, *Potamogeton crispus*, and *Hydrilla verticillata* var. *rosburghii*.

In some embodiments, an area of the aquatic plants may be 30%-40% of aquaculture water surface.

(3) Stocking oriental river prawn postlarvae in early July.

In some embodiments, the oriental river prawn postlarvae may be stocked at 45,000-52,000 postlarvae/mu.

In some embodiments, the surrounding ring ditch may be disinfected with bleaching powder 7 days before the oriental river prawn postlarvae are stocked, and the postlarvae may be put when toxicity disappears.

In some embodiments, special shrimp compound feed may be fed during the aquaculture of the oriental river prawn, and the feed may be fed along the surrounding of the paddy field.

In some embodiments, an oxygen booster pump may be provided during the aquaculture of the oriental river prawn, and the oxygen booster pump may be connected with a tray aerator for oxygenation. The machine may be powered on to continuously increase oxygen every night and on cloudy and rainy days to prevent the oriental river prawn from being hypoxic and floating.

(4) Harvesting ripe rice in late October.

(5) Catching and marketing the oriental river prawns from late October to January of the following year.

In the foregoing integrated rice-crayfish-oriental river prawn planting-breeding method, disinfection may be conducted before stocking both the crayfish postlarvae and the oriental river prawn postlarvae, and the disinfection before stocking may be implemented by immersion in 5% saline solution for 5-10 min or immersion in 5 ppm potassium permanganate for 10-20 min. Stocking timing may be selected to be in the early morning of a sunny day or on a cloudy day, and a temperature difference between a water temperature for aquaculture and a water temperature for stocking may be no more than 3° C.; the postlarvae may be evenly stocked in the ring ditch surrounding the paddy field.

The embodiments of the present disclosure has the following technical characteristics:

1. In the existing continuous cropping and symbiotic integrated farming mode, different bred aquatic species cannot "peacefully coexist", affecting the breeding efficiency. In the present disclosure, oriental river prawn is omnivorous and can co-exist with crayfish, without affecting the aquaculture production of crayfish.

2. Oriental river prawns are widely distributed in China's rivers, lakes, reservoirs and ponds. Oriental river prawns have strong adaptability and are characterized by omnivory, fast growth and strong fecundity. Its flesh is tender and well received by the market. The market price thereof is high, generally reaching 100-120 yuan/kg, with high economic value. In addition, oriental river prawns, due to low temperature tolerance thereof, can be raised until the market demand is greatest around the Spring Festival to achieve better economic benefits.

3. In the present disclosure, after raising crayfish in the paddy field, pests and diseases of rice are substantially reduced, and sufficiently applied basal fertilizer and crayfish excrement contain abundant nutrients required for rice growth, and the rice growth is generally not short of fertilizer, so the present disclosure may reduce the use of pesticides and chemical fertilizers and has the advantages of ecological and environmental protection.

4. The present disclosure effectively expands the time and space of planting-breeding in the paddy field, increases the comprehensive benefits of paddy field aquaculture, further improves the yield and quality of agricultural products, and realizes the common development of aquaculture and agricultural cultivation.

DETAILED DESCRIPTION OF THE EMBODIMENTS

In order to make the objective, technical solution and advantages of the embodiments of the present disclosure clearer, the technical solutions in the embodiments of the present disclosure will be described clearly and completely below. Apparently, the described embodiments are a part of, but not all of, the embodiments of the present disclosure. Based on the described embodiments of the present disclosure, all other embodiments obtained by those of ordinary skill in the art without creative work shall fall within the protection scope of the present disclosure.

Unless otherwise defined, technical or scientific terms used in the present disclosure should have the ordinary meaning as understood by one of ordinary skill in the art to which this present disclosure belongs.

Field selection: It is required that a piece of paddy field has sufficient water sources and convenient water intake and drainage. Weakly alkaline loam is preferred, and the soil with substrate pH value lower than 5 or higher than 9.5 is not suitable for crayfish aquaculture. It is required that a selected paddy field should be provided with a complete facility of a farmland water conservancy project, water supply, roads, electricity, and convenient transportation.

In this example, two experimental plots were selected, and paddy field areas were 7 and 8 mu, respectively. Ring trenches were excavated along the surroundings of the plots. The ring ditch could be used as a place for crayfish to avoid summer heat in hot summer and as a place for shelter, shade and habitat during rice sun-drying, fertilization and spraying. The excavation area accounted for no greater than 10% to ensure no decrease in rice production. The ditches of the experimental plots were 2.5 m wide at the top, 1 m wide at the bottom and 1 m deep, and had a slope ratio of 1:1.5. Moreover, the ring ditches were tamped tightly to ensure no cracking, no leakage, and no collapse.

Crayfish (*P. clarkii*) postlarvae were stocked in the ring ditch surrounding the paddy field in late March. The crayfish postlarvae were immersed in 5% saline solution for 10 min before stocking, and the temperature difference between a water temperature for aquaculture and a water temperature for stocking was no more than 3° C. On average, 22.5 kg of crayfish were stocked per mu, with a specification of 200-

240 postlarvae/kg (the average price of crayfish postlarvae was 16 yuan/catty). Equivalently, 4,500-5,400 crayfish postlarvae were stocked per mu. The crayfish grew fast from April to May. They were mainly fed with compound feed with high protein content based on 8%-10% of the total crayfish weight. The crayfish were fed in the morning and evening daily, mainly in the evening, accounting for 70% of the feed amount throughout the day. After rearing for about two months, big ones were caught and went on sale and small ones were left since May until the catching ended in early June. After most of the crayfish were sold, the water level was slowly lowered until the field board was exposed, and the remaining crayfish hid in the ring ditch as the water level dropped; the field surface was plowed with a rotary tiller.

The hybrid rice *O. sativa* cv. Jiayouzhongke 3 was planted in mid-June. After the rice seedlings were sun-dried in the paddy field in late June, the surrounding ring ditches around the paddy field were cleaned and disinfected. Water was added to 20 cm above the field surface before the seedlings were dropped, and some aquatic plants such as *E. nuttallii* and *A. philoxeroides* were transplanted.

The surrounding ring ditches were disinfected with bleaching powder 7 days before postlarvae were stocked. After the toxicity disappeared, in the hot summer, in early July, *M. nipponense* cv. Taihu No. 2 with a specification of 6,000-7,000 postlarvae/kg were stocked, and 7.5 kg of the postlarvae were stocked per mu. Equivalently, 45,000-52,000 oriental river prawn (*M. nipponense*) postlarvae were stocked per mu. Special shrimp compound feed was fed during the aquaculture, and the feed was fed along the surrounding of the paddy field. During the aquaculture, an oxygen booster pump was provided with a PVC plastic pipe connecting nano tray aerators for oxygenation. The number of nano tray aerators was 3-4 aerators per mu. The machine was powered on to continuously increase oxygen every night and on cloudy and rainy days to prevent the oriental river prawn from being hypoxic and floating. The period from July to October in summer and autumn was the peak feeding and growing seasons for oriental river prawns, and they were fed based on 3%-5% of the total prawn weight. They could be fed every other day in winter, but not in low temperature season. The amount of feed fed each time was preferably consumed within 2 h. The feed amount was reduced when the feed was not consumed within 2 h.

Ripe rice was harvested in late December. During the entire integrated planting and breeding production process in the experimental plots, the chemical fertilizers consumption (compound fertilizer 20 kg/mu, and urea 7.5 kg/mu) was reduced by 54.2% compared with that for original single rice planting (60 kg/mu); the pesticide consumption (for 6 times, 72 g) was reduced by 64.9% compared with that for original single rice planting (for 8 times, 205 g). However, the rice yield per mu still reached 625 kg/mu, which was almost the same as that for the original single rice planting.

In November, after aquaculture for more than 4 months, most of oriental river prawns reached the market size (body length reached 4-5 cm), and began to be caught.

Profits of the integrated rice-crayfish-oriental river prawn planting-breeding method:

(1) Profit and output value of oriental river prawns: the oriental river prawn yield was 14.2 kg per mu. Calculated at 120 yuan/kg, the output value per mu was 1,704 yuan. After deduction of the costs of postlarvae, feed and electricity, namely 1,178.8 yuan/mu, the profit per mu reached 525.2 yuan, and the comprehensive economic benefit increased by 31.2%.

(2) Profits of crayfish: the average crayfish yield per mu was 106 kg, the average price was 25.6 yuan/kg, the output value per mu was 2,706 yuan, and the costs per mu were as follows: crayfish postlarvae: 720 yuan/mu, feed: 385 yuan/mu, water modifier (amino acid fertilizer water paste): 155 yuan/mu, labor 250 yuan/mu, water and electricity: 50 yuan/mu; the total cost per mu was 1,560 yuan/mu, and the profit per mu was 1,146 yuan/mu.

(3) Profits of rice: the output value of rice was: 625 kg/mu×2.7 yuan/kg=1,687.5 yuan/mu. Rice costs were as follows: rent: 850 yuan/mu, rice seeds: 2 kg/mu (rice transplantation by hand)×76 yuan/kg (hybrid rice seeds)=152 yuan/mu; tractor plowing: 90 yuan/mu; artificial planting: 200 yuan/mu, chemical fertilizers and pesticides: 100 yuan/mu (chemical fertilizers: 50 yuan; pesticides: 50 yuan), management: 50 yuan/mu, harvesting: 50 yuan/mu, water: 20 yuan/mu; total: 1,512 yuan/mu. The profit of rice was: 1,688 yuan/mu−1,512 yuan/mu=176 yuan/mu. The state subsidy was 360 yuan/mu, and the profit from rice planting was: 176 yuan/mu+360 yuan/mu=536 yuan/mu.

(4) Improvement of the comprehensive economic benefit: (1) the cost per mu was: 7.5 kg/mu×120 yuan/kg (oriental river prawn postlarvae)+41 kg×6.8 yuan/kg (feed)=1,178.8 yuan; (2) output value per mu: oriental river prawn yield per mu was 14.2 kg/mu×120 yuan/kg=1,704 yuan; (3) the profit per mu was: 1,704 yuan−1,178.8 yuan=525.2 yuan; (4) improvement of the comprehensive economic benefit was: 525.2 yuan/mu÷1,682 yuan/mu×100%=31.2%.

To sum up, the integrated rice-crayfish-oriental river prawn planting-breeding method provided by the present disclosure may reduce the consumptions of pesticides and chemical fertilizers, realize the effective expansion of the time and space of the paddy field, and improve the comprehensive benefits of rice-fish farming.

The descriptions of the above example are only intended to help understand the method and the core idea of the present disclosure. It should be noted that several improvements and modifications may also be made by those of ordinary skill in the art without departing from the principle of the present disclosure, and these improvements and modifications fall within the protection scope of the claims of the present disclosure.

What is claimed is:

1. An integrated rice-crayfish-oriental river prawn planting-breeding method, wherein the method comprises the following steps:
   step 1, stocking crayfish postlarvae in a paddy field as an integrated rice-crayfish-oriental river prawn farming area from February to March of a year, catching and marketing the crayfish from May to June of the year;
   step 2, planting rice from late May to mid-June of the year, sun-drying rice seedlings in the field in late June of the year, cleaning and disinfecting a ring ditch surrounding the paddy field, and transplanting some aquatic plants;
   step 3, stocking oriental river prawn postlarvae in early July of the year;
   step 4, harvesting ripe rice in late October of the year; and
   step 5, catching and marketing the oriental river prawns in November of the year.

2. The method according to claim 1, wherein the crayfish postlarvae are stocked at 3,000-6,000 postlarvae/mu.

3. The method according to claim 1, wherein the paddy field is surrounded by a ring ditch, and the ring ditch is 2.5 m wide at the top, 1.0 m wide at the bottom, and 1.0 m deep, and has a slope ratio of 1:1.5; an area of the ring ditch accounts for no greater than 10% of that of the paddy field.

4. The method according to claim 1, wherein the rice is one or both of hybrid rice *Oryza sativa* cv. Jiayouzhongke 3 and *Oryza sativa* cv. Chunyou T30.

5. The method according to claim 1, wherein the aquatic plants comprise one or more of *Elodea nuttallii, Alternanthera philoxeroides, Potamogeton crispus*, and *Hydrilla verticillata* var. *rosburghii*.

6. The method according to claim 1, wherein an area of the aquatic plants is 30%-40% of aquaculture water surface.

7. The method according to claim 1, wherein the oriental river prawn postlarvae are stocked at 45,000-52,000 postlarvae/mu.

8. The method according to claim 1, wherein the surrounding ring ditch is disinfected with bleaching powder 7 days before the oriental river prawn postlarvae are stocked.

9. The method according to claim 1, wherein an oxygen booster pump is provided for oxygenation during the aquaculture of the oriental river prawns.

10. The method according to claim 1, wherein disinfection is conducted before stocking of both the crayfish postlarvae and the oriental river prawn postlarvae, and the disinfection before stocking is implemented by immersion in 5% saline solution for 5-10 min or immersion in 5 ppm potassium permanganate for 10-20 min; stocking timing is selected to be in the early morning of a sunny day or on a cloudy day, and a temperature difference between a water temperature for aquaculture and a water temperature for stocking is no more than 3° C.; the postlarvae are evenly stocked in the ring ditch surrounding the paddy field.

\* \* \* \* \*